United States Patent
Lim

(10) Patent No.: US 12,522,951 B2
(45) Date of Patent: Jan. 13, 2026

(54) FLAME-RETARDANT POLYESTER FIBER WITH EXCELLENT DYEABILITY AND MANUFACTURING METHOD THEREFOR

(71) Applicant: Toray Advanced Materials Korea Inc., Gyeongsangbuk-do (KR)

(72) Inventor: Seong Su Lim, Gyeongsangbuk-do (KR)

(73) Assignee: Toray Advanced Materials Korea Inc., Gyeongsangbuk-do (KR)

( * ) Notice: Subject to any disclaimer, the term of this patent is extended or adjusted under 35 U.S.C. 154(b) by 380 days.

(21) Appl. No.: 18/017,600

(22) PCT Filed: Jul. 21, 2021

(86) PCT No.: PCT/KR2021/009391
§ 371 (c)(1),
(2) Date: Jan. 23, 2023

(87) PCT Pub. No.: WO2022/019639
PCT Pub. Date: Jan. 27, 2022

(65) Prior Publication Data
US 2023/0313418 A1    Oct. 5, 2023

(30) Foreign Application Priority Data

Jul. 23, 2020 (KR) ........................ 10-2020-0091496

(51) Int. Cl.
*D01F 1/07* (2006.01)
*D01D 5/098* (2006.01)
*D01F 6/62* (2006.01)

(52) U.S. Cl.
CPC .............. *D01F 1/07* (2013.01); *D01D 5/098* (2013.01); *D01F 6/62* (2013.01); *D10B 2331/04* (2013.01); *D10B 2401/063* (2013.01); *D10B 2401/14* (2013.01)

(58) Field of Classification Search
None
See application file for complete search history.

(56) References Cited

U.S. PATENT DOCUMENTS 5,554,674 A * 9/1996 Hamilton ................ C08L 67/02
524/417

FOREIGN PATENT DOCUMENTS

| JP | 2004232172 A | | 8/2004 |
| JP | 2006274506 A | | 10/2006 |
| JP | 2010037375 | * | 2/2010 |
| JP | 2010126614 A | | 6/2010 |
| JP | 2011012200 A | | 1/2011 |
| JP | 2016151000 A | | 8/2016 |
| KR | 1020040022101 A | | 3/2004 |
| KR | 1020040030060 A | | 4/2004 |
| KR | 1020160130764 A | | 11/2016 |
| KR | 20170004170 | * | 1/2017 |
| KR | 1020170004170 A | | 1/2017 |

OTHER PUBLICATIONS

Machine translation of JP2004232172 (Year: 2004).*
Machine translation of JP2010037375 (Year: 2010).*
Machine translation of KR20170004170 (Year: 2017).*

* cited by examiner

*Primary Examiner* — Shawn Mckinnon
(74) *Attorney, Agent, or Firm* — Morrison & Foerster LLP

(57) ABSTRACT

The present invention relates to a flame-retardant polyester fiber manufactured by using a titanium-based catalyst and an additive-type flame retardant, and relates to a flame-retardant polyester fiber with excellent dyeability characterized by generating a small amount of acetaldehyde, with excellent dyeability, and generating remarkably low contamination on a nozzle surface, and to a manufacturing method therefor.

5 Claims, No Drawings

FLAME-RETARDANT POLYESTER FIBER WITH EXCELLENT DYEABILITY AND MANUFACTURING METHOD THEREFOR

CROSS-REFERENCE TO RELATED APPLICATION

This application is a national stage application under 35 U.S.C. § 371 of International Application No. PCT/KR2021/009391, filed internationally on Jul. 21, 2021, which claims priority to and the benefit of Korean Patent Application No. 10-2020-0091496, filed on Jul. 23, 2020, the disclosures of which are incorporated herein by reference in their entireties.

TECHNICAL FIELD

The present invention relates to a flame-retardant polyester fiber with excellent dyeability.

BACKGROUND ART

Polyester has characteristics such as excellent mechanical properties, chemical stability, a high melting point and the like, and it is a commercially very important polymer material, which is not only the material of the most widely used synthetic fiber today, but also the material of various plastic products. In order to expand the application range of such polyesters, many studies have been conducted, and particularly, attempts to improve various properties and enhance productivity by synthesizing a polyester having a high degree of polymerization and a low carboxyl group content at a shorter time have been steadily conducted.

Meanwhile, in the manufacturing process of the polyester resin, antimony compounds or germanium compounds are generally used in an industrial scale. However, polyester resins which are prepared by using antimony compounds as catalysts have negative effects on safety and hygiene and the environment due to their toxicity, and also, in polyester resins using germanium compounds as catalysts, they are suitable in terms of transparency, safety and hygiene and the like, but since the germanium compound itself is very expensive and economically disadvantageous, the emergence of a polycondensation catalyst instead of the above is strongly desired. For example, Korean Patent Application No. 10-2016-0130764 discloses a flame-retardant polyester composition prepared by using an antimony-based catalyst.

For this reason, numerous compounds have been proposed as catalysts instead of antimony compounds or germanium compounds used in the related art, and among these, titanium-based catalysts are attracting attention because they are inexpensive and have no problems in terms of safety and hygiene. However, the polyester resin prepared by using the titanium-based catalyst has disadvantages in that the polyester resin has a unique yellow color and the heat stability also deteriorates. In addition, acetaldehyde is generated in a large amount from a decomposition reaction during, for example, polycondensation and melt molding, and thus, there is a need for research thereon.

Meanwhile, flame retardants are classified into the additive type and the reaction type according to the method of using a flame retardant for the polyester resin, and among these, an additive-type flame retardant means a method of improving the flame retardancy of a polymer by physically adding the flame retardant to the polymer material. For example, Korean Patent Application No 10-2004-00252101 discloses a polyester fiber and a non-woven fabric manufactured by adding an additive-type flame retardant to a polyester resin.

The additive-type flame retardant has an advantage in that it is easy to mix with a polyester resin and the flame retardant effect is excellent, but because of a relatively high b value (b*), the polyester fiber manufactured by using an additive-type flame retardant has a problem in that the color yield is lowered compared to the flame-retardant polyester resin to which CEPPA, which is a mainstream product of the conventional flame-retardant polyester market, is applied.

In addition, when the high-temperature dyeing condition and the excess amount of dye are applied, thermal decomposition and hydrolysis proceed on the main chain of the flame-retardant polyester resin, and thus, not only the deterioration in the strength and durability of a flame-retardant polyester fiber occurs, but also the deterioration in flame retardancy may occur due to the omission of a flame retardant.

DISCLOSURE

Technical Problem

The present invention has been devised to solve the above-described problems, and the present invention is directed to manufacturing a flame-retardant polyester fiber with excellent dyeability which includes little or no antimony and/or cobalt components in the fiber and uses an additive-type flame retardant.

Technical Solution

The flame-retardant polyester fiber with excellent dyeability according to the present invention may include 10 to 20 ppm of titanium (Ti) element in the fiber; and an additive-type flame retardant represented by Chemical Formula 1 below in an amount of 0.55 to 0.75 wt. % based on the amount of phosphorus (P) element in 100 wt. % of the fiber:

[Chemical Formula 1]

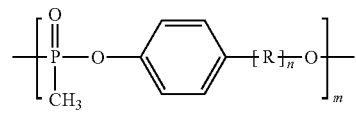

wherein in Chemical Formula 1 above, R is an alkylene group having 1 to 5 carbon atoms, n is an integer of 1 to 20, and m is an integer of 1 to 80.

In a preferred exemplary embodiment of the present invention, the additive-type flame retardant may have a weight average molecular weight of 5,000 to 11,000.

In a preferred exemplary embodiment of the present invention, the titanium (Ti) element may be derived from a titanium-based catalyst represented by Chemical Formula 2 below:

[Chemical Formula 2]

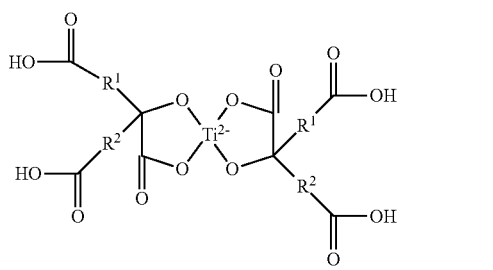

wherein in Chemical Formula 2 above, $R^1$ and $R^2$ are each independently a straight-chain alkylene group having 1 to 5 carbon atoms or a branched alkylene group having 3 to 5 carbon atoms.

In a preferred exemplary embodiment of the present invention, the fiber may have b* of 1.0 to 2.5 when chromaticity coordinates are calculated by using a CIE standard light source and a standard observer.

In a preferred exemplary embodiment of the present invention, the fiber may have an acetaldehyde generation amount of 400 ppb or less as measured through a gas detection tube.

In a preferred exemplary embodiment of the present invention, the fiber may have a limiting oxygen index (LOI) of 30% or more as measured according to the KS M 3032 method.

In a preferred exemplary embodiment of the present invention, the fiber may have a strength of 3.6 to 6.0 g/de.

As another object of the present invention, the method for manufacturing a flame-retardant polyester fiber with excellent dyeability according to the present invention may include step 1 of obtaining an ester reactant by reacting an acid component and a diol component; step 2 of preparing a polymerization product by mixing and reacting a polymerization reactant including the ester reactant, a heat stabilizer and a titanium-based catalyst; step 3 of removing impurities from the polymerization product; step 4 of preparing a flame-retardant polyester resin by mixing the polymerization product obtained in step 3 and an additive-type flame retardant represented by Chemical Formula 1 below; step 5 of producing a spinning product by spinning the flame-retardant polyester resin; and step 6 of stretching the spinning product to manufacture a flame-retardant polyester fiber.

In a preferred exemplary embodiment of the present invention, the additive-type flame retardant may be included in an amount of 5.0 to 7.0 wt. % based on the total weight of the flame-retardant polyester resin:

[Chemical Formula 1]

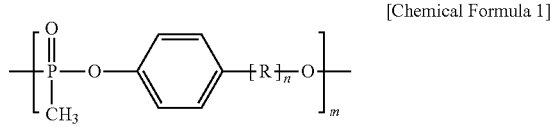

wherein in Chemical Formula 1 above, R is an alkylene group having 1 to 5 carbon atoms, n is an integer of 1 to 20, and m is an integer of 1 to 80.

In a preferred exemplary embodiment of the present invention, the titanium-based catalyst may include 200 to 400 ppm of a catalyst represented by Chemical Formula 2 below based on the total weight of the polymerization reactant:

[Chemical Formula 2]

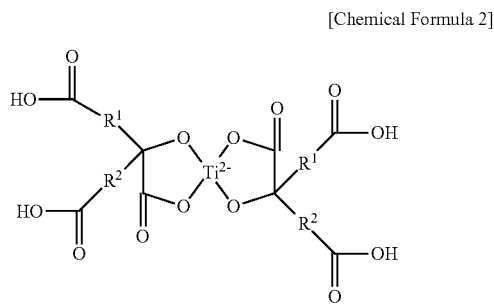

wherein in Chemical Formula 2 above, $R^1$ and $R^2$ are each independently a straight-chain alkylene group having 1 to 5 carbon atoms or a branched alkylene group having 3 to 5 carbon atoms.

Advantageous Effects

Since the flame-retardant polyester fiber of the present invention does not include an antimony-based compound and/or a cobalt-based compound, it is human-friendly and has excellent flame retardancy as well as dyeability, and when the flame-retardant polyester fiber is manufactured, the acetaldehyde generation amount is low, and the spinneret nozzle surface contamination is remarkably low.

MODES OF THE INVENTION

Hereinafter, the flame-retardant polyester fiber with excellent dyeability according to the present invention will be described in more detail through a manufacturing method.

The method for manufacturing a flame-retardant polyester fiber may include step 1 of obtaining an ester reactant by reacting an acid component and a diol component; step 2 of preparing a polymerization product by mixing and reacting a polymerization reactant including the ester reactant, a heat stabilizer and a titanium-based catalyst; step 3 of removing impurities from the polymerization product; step 4 of preparing a flame-retardant polyester resin by mixing the polymerization product obtained in step 3 and an additive-type flame retardant represented by Chemical Formula 1 below; step 5 of producing a spinning product by spinning the flame-retardant polyester resin; and step 6 of stretching the spinning product to manufacture a flame-retardant polyester fiber.

Specifically, the acid component and the diol component may be included at a molar ratio of 1:1.0 to 1:5.0, and preferably, at a molar ratio of 1:1.0 to 1:2.0. In this case, if the diol is included at a molar ratio of less than 1.0 based on the acid, there may be a problem in that during polymerization, acidity is excessively increased, which may cause side reactions to be promoted. In addition, if the diol is included at a molar ratio of more than 5.0, there may be a problem in that the degree of polymerization does not increase.

Meanwhile, the acid component may include at least one selected from terephthalic acid, aromatic polyhydric carboxylic acid having 6 to 14 carbon atoms, aliphatic polyhydric carboxylic acid having 2 to 14 carbon atoms and a sulfonic acid metal salt, and preferably, it may include at least one selected from terephthalic acid, aromatic polyhydric carboxylic acid having 6 to 12 carbon atoms, aliphatic polyhydric carboxylic acid having 3 to 14 carbon atoms and a sulfonic acid metal salt. In addition, preferred examples of the acid component may include at least one selected from oxalic acid, malonic acid, succinic acid, glutaric acid, adipic acid, suberic acid, citric acid, pimeric acid, azelaic acid, sebacic acid, nonanoic acid, decanoic acid, dodecanoic acid and hexanodecanophosphoric acid, and more preferably, as the acid component, terephthalic acid, which does not deteriorate the heat resistance of the polyester, may be most preferred.

Meanwhile, the diol component may include a component represented by the Chemical Formula 3 below, and in addition to this, the diol component may further include ethylene glycol and the like.

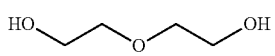

[Chemical Formula 3]

In addition, the ester reaction of step 1 may be carried out under esterification reaction conditions commonly used in the art, and as a preferred example, it may be carried out at a speed of 40 to 80 rpm for 150 to 240 minutes under 200 to 260° C., and more preferably, it may be carried out at a speed of 50 to 70 rpm for 180 to 210 minutes under 210 to 250° C.

In addition, the heat stabilizer may use a general heat stabilizer used in the art, and preferably, one or two or more selected from trimethylphosphate, triethylphosphate, tributyl phosphate, tributoxyethyl phosphate, tricresyl phosphate, triarylphosphate isopropylated and hydroquinone bis-(diphenyl phosphate) may be mixed and used.

In addition, the heat stabilizer may be included in an amount of 10 to 30 ppm, and preferably, 15 to 25 ppm, based on the amount of phosphorus (P) element in the total weight of the polymerization reactant.

In addition, the polymerization product may further include a complementary colorant. A mixture of blue and red dyes may be used as the complementary colorant, and the dye may be characterized that it replaces a cobalt compound, which induces pulmonary interstitial fibrosis and is classified as a human carcinogen, and it is harmless to the human body. In addition, the complementary colorant may be included in the polymerization product in an amount of 1 to 10 ppm, and preferably, 3 to 7 ppm.

In addition, the titanium-based catalyst may be a titanium-based catalyst represented by Chemical Formula 2 below, and preferably, a titanium chelate-based catalyst represented by Chemical Formula 2 below.

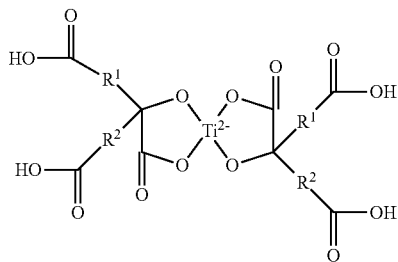

[Chemical Formula 2]

In Chemical Formula 2 above, $R^1$ and $R^2$ may each independently be a straight-chain alkylene group having 1 to 5 carbon atoms or a branched alkylene group having 3 to 5 carbon atoms, and preferably, it may be a straight-chain alkylene group having 1 to 3 carbon atoms or a branched alkylene group having 3 to 4 carbon atoms.

In addition, since the titanium-based catalyst represented by Chemical Formula 2 above is stable even in the presence of water molecules, it is not deactivated even if it is added before the ester reaction in which a large amount of water is produced, and as a result, the esterification reaction and polycondensation reaction may be carried out in a shorter time than in the related art, and it is possible to suppress coloration. In addition, the titanium-based catalyst has excellent polymerization reactivity even at a low polymerization temperature, and the generation of a carboxyl group (—COOH) at the terminal of the polyester resin prepared by a relatively high degree of polymerization is reduced such that during the spinning process, the contamination of a nozzle surface by oligomers and monomers may be reduced, and the number of times the nozzle surface is cleaned may be reduced such that there is an effect of improving the production yield and reducing the defect rate. In addition, it is possible to manufacture a human-friendly polymer with a reduced content of acetaldehyde.

In addition, the titanium-based catalyst may be included in an amount of 200 to 400 ppm, preferably, 220 to 380 ppm, and more preferably, 250 to 350 ppm, based on the total weight of the polymerization reactant. If it is included at less than 200 ppm, the b * (b value) of the fiber becomes excessively high, and the dyeability and dyeing rate of the fiber become poor, and since the acetaldehyde generation amount increases, there may be a problem that it is impossible to manufacture human-friendly polymers. In addition, if it is included at more than 400 ppm, there may be a problem in that the occurrence of a carboxyl group (—COOH) at the terminal of the flame-retardant polyester resin is excessively increased.

Next, the polymerization reaction of step 2 may be carried out by gradually increasing the temperature to 270 to 290° C., and preferably, to 275 to 285° C., while gradually reducing the pressure such that the final pressure becomes 0.5 torr.

Next, the removal of impurities in step 3 may be performed through a vacuum pump under reduced pressure to remove unreacted oligomers and side reactants, and it may be performed for 20 to 40 minutes, and preferably, for 25 to 35 minutes.

Next, the additive-type flame retardant in step 4 may be an additive-type flame retardant represented by Chemical Formula 1 below, and the additive-type flame retardant may be included in an amount of 5.0 to 7.0 wt. % based on the total weight of the flame-retardant polyester resin, preferably, 5.2 to 6.8 wt. %, and more preferably, 5.5 to 6.5 wt. %. If it is included at less than 5.0 wt. %, there may be a problem that the flame retardancy is insufficient or the flame retardant properties are not uniform. In addition, if it is included at more than 7.0 wt. %, there may be a problem in that the number of wiping of the spinneret increases due to high viscosity.

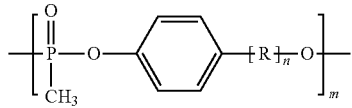

[Chemical Formula 1]

In Chemical Formula 1 above, R is an alkylene group having 1 to 5 carbon atoms, and preferably, an alkylene group having 2 to 4 carbon atoms. In addition, n is an integer of 1 to 20, and preferably, an integer of 5 to 10. In addition, m is an integer of 1 to 80, and preferably, an integer of 20 to 40.

In addition, the additive-type flame retardant may have a weight average molecular weight of 4,000 to 11,000, preferably, 5,000 to 10,000, and more preferably, 6,000 to 8,000. If the weight average molecular weight is less than 4,000, there may be a problem in that the spinning mobility is lowered due to low viscosity. In addition, if it is more than 11,000, there may be a problem in that due to the high viscosity of the polymer, the discharge amount is not uniform due to the pressure loss during the spinning process, which may result in poor fineness uniformity of the fiber.

In addition, the flame-retardant polyester resin prepared through step 4 may have a number of carboxyl groups (—COOH) of 33 to 40 as measured by the PHOL method, and preferably, 33 to 38. If the number of carboxyl groups is more than 40, as the degree of contamination on the nozzle surface increases, the economic feasibility of the process may also become poor.

In addition, the flame-retardant polyester resin may have an intrinsic viscosity of 0.60 to 0.80 dL/g, and preferably, 0.62 to 0.78 dL/g.

Next, the spinning of step 5 may be performed through a spinneret (nozzle), and the spinneret may preferably have a shape of ○. In addition, it may be carried out at a spinning rate of 1,000 to 1,300 mpm (meters per minute) under 250 to 290° C., and, preferably, at a spinning rate of 1,050 to 1,250 mpm under 260 to 280° C.

Next, the stretching of step 6 may be carried out at a stretching ratio of 2.5 to 4.1, and preferably, at a stretching ratio of 2.8 to 3.8.

The flame-retardant polyester fiber manufactured by the above method may include the titanium (Ti) element in an amount of 10 to 20 ppm based on the total weight of the fiber, preferably, 12 to 18 ppm, and more preferably, 14 to 16 ppm.

In this case, if the Ti element content is included at less than 10 ppm, there may be problems in that the dyeability and dyeing rate of the fiber are poor, and the acetaldehyde generation amount increases, and thus, there may be a problem in that it is not possible to manufacture a human-friendly fiber. In addition, if it is included at more than 20 ppm, there may be a problem in that the number of carboxyl groups at the terminal of the manufactured polyester resin is excessively increased, and accordingly, there may be a problem in that the economic feasibility of the process becomes poor as the contamination of the nozzle surface increases.

In addition, the titanium (Ti) element may be derived from a titanium-based catalyst represented by Chemical Formula 2 below.

[Chemical Formula 2]

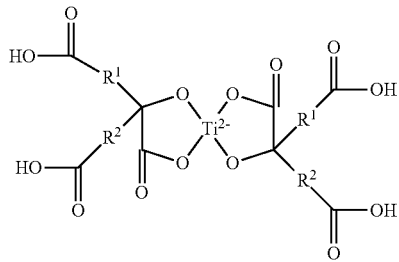

In Chemical Formula 2 above, $R^1$ and $R^2$ may each independently be a straight-chain alkylene group having 1 to 5 carbon atoms or a branched alkylene group having 3 to 5 carbon atoms, and preferably, a straight-chain alkylene group having 1 to 3 carbon atoms or a branched alkylene group having 3 to 4 carbon atoms.

In addition, the flame-retardant polyester fiber may include an additive-type flame retardant in an amount of 0.55 to 0.75 wt. %, and preferably, 0.58 to 0.72 wt. %, based on the amount of phosphorus (P) element in the total weight.

The physical properties of the flame-retardant polyester fiber are as follows.

First, the fiber may have a limiting oxygen index (LOI) of 30% or more as measured according to the KS M 3032 method, preferably, 30 to 40%, and more preferably, 30 to 36%.

In addition, the fiber may have b * (b value) of 1.0 to 2.5, and preferably, 1.0 to 2.1, when chromaticity coordinates are calculated by using a CIE standard light source and a standard observer.

In addition, the fiber may have a strength of 3.6 to 6.0 g/de, preferably, 4.0 to 6.0 g/de, and more preferably, 4.4 to 5.2 g/de. If the strength of the fiber is less than 3.6 g/de, the strength may be too low to be suitable for use as a carpet or interior fabric.

In addition, the fiber may have an acetaldehyde generation amount of 400 ppb or less, preferably, 300 to 400 ppb, and more preferably, 310 to 390 ppb, as measured by the gas detector tube method.

It is possible to manufacture a carpet or interior fabric which is molded into a predetermined shape by including the flame-retardant polyester fiber, and preferred examples of the interior fabric may include blinds, curtains and the like.

In the above, the present invention has been mainly described with respect to the embodiments, but these are only examples and do not limit the embodiments of the present invention, and those skilled in the art to which the exemplary embodiments of the present invention pertain will understand that various modifications and applications that are not exemplified above are possible without departing from the essential characteristics of the present invention. For example, each component that is specifically shown in the embodiments of the present invention can be modified and implemented. In addition, differences that are related to these modifications and applications should be construed as being included within the scope of the present invention as defined in the appended claims.

EXAMPLE

Example 1: Manufacture of Flame-Retardant Polyester Fiber

Terephthalic acid (TPA) was prepared as an acid component, and ethylene glycol (EG) was prepared as a diol component.

Next, the acid component and the diol component were mixed at a molar ratio of 1:1.12, and then esterified at a pressure of 1,140 torr under 250° C. to prepare an ester reactant.

Next, after transferring the ester reactant to a polycondensation reactor, a polymerization product was prepared by reacting a polymerization reactant in which the ester reactant, a heat stabilizer and a titanium-based catalyst represented by the following Chemical Formula 2-1 were mixed. In this case, the polymerization was carried out by raising the temperature to 280° C. while gradually reducing the pressure to a final pressure of 0.5 torr.

[Chemical Formula 2-1]

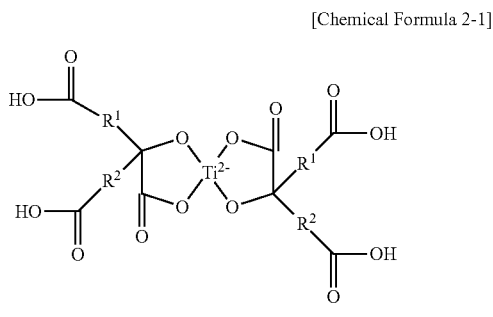

In Chemical Formula 2-1 above, $R^1$ and $R^2$ are each independently a straight-chain alkylene group having 1 carbon atom.

In addition, triethyl phosphoric acid was used as the heat stabilizer, and the heat stabilizer was added in an amount of 25 ppm based on the amount of phosphorus (P) element in the total weight of the polymerization reaction product.

In addition, the titanium-based catalyst was added in an amount of 300 ppm based on the total weight of the polymerization reactant.

In addition, the removal of impurities in the polymerization product may be carried out by using a vacuum pump under reduced pressure to remove unreacted oligomers and side reactants, and it was carried out for 30 minutes.

In addition, 6 wt. % of the additive-type flame retardant (weight average molecular weight of 7,000) and the remaining amount of the polymerization product represented by Chemical Formula 1-1 below were mixed to prepare a flame-retardant polyester resin, and then, the flame-retardant polyester resin was spun to produce a spinning product. In this case, the spinning was carried out at a spinning speed of 1,250 mpm (meter per minute) under 275° C.

[Chemical Formula 1-1]

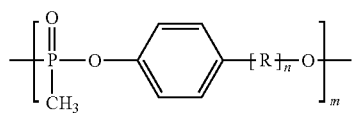

In Chemical Formula 1-1 above, R is a straight-chain alkylene group having 3 carbon atoms, n is an integer of 10, and m is an integer of 40.

In addition, the spinning product was stretched at a stretching ratio of 3.3 to manufacture a flame-retardant polyester fiber.

Examples 2 to 3: Manufacture of Flame-Retardant Polyester Fibers

Examples 2 to 3 were performed by manufacturing flame-retardant polyester fibers in the same manner as in Example 1, except that the content of the titanium-based catalyst was changed as shown in Table 1 below.

Examples 4 to 5: Manufacture of Flame-Retardant Polyester Fibers

Examples 4 to 5 were performed by manufacturing flame-retardant polyester fibers in the same manner as in Example 1, except that the content of the flame retardant was changed as shown in Table 1 below.

Examples 6 to 7: Manufacture of Flame-Retardant Polyester Fibers

Examples 6 to 7 were performed by manufacturing flame-retardant polyester fibers in the same manner as in Example 1, except that the molecular weight of the flame retardant was changed as shown in Table 1 below.

Comparative Example 1 to Comparative Example 2: Manufacture of Polyester Fibers

Comparative Examples 1 to 2 were performed by manufacturing flame-retardant polyester fibers in the same manner as in Example 1, except that the content of the titanium-based catalyst represented by Chemical Formula 2 was changed as shown in Table 1 below.

Comparative Example 3 to Comparative Example 4: Manufacture of Polyester Fibers

Comparative Examples 3 to 4 were performed by manufacturing flame-retardant polyester fibers in the same manner as in Example 1, except that the content of the flame retardant was changed as shown in Table 1 below.

Comparative Example 5 to Comparative Example 6: Manufacture of Polyester Fibers

Comparative Examples 5 to 6 were performed by manufacturing flame-retardant polyester fibers in the same manner as in Example 1, except that the molecular weight of the flame retardant was changed as shown in Table 1 below.

Comparative Examples 7 to 10: Manufacture of Polyester Fibers

Comparative Examples 7 to 10 were performed by manufacturing flame-retardant polyester fibers in the same manner as in Example 1, except that the types and contents of polymerization catalysts were changed as shown in Table 1 below.

TABLE 1

| | Manufacturing process | | | | Fiber | |
|---|---|---|---|---|---|---|
| | Polymerization catalyst | | Additive-type flame retardant | | Remaining amount of Ti (ppm) | Remaining flame retardant (wt. % based on P element) |
| | Type | Content (ppm) | Weight average molecular weight | Content (wt. %) | | |
| Example 1 | Chemical Formula 2-1 | 300 | 7,000 | 6.0 | 15 | 0.65 |
| Example 2 | Chemical Formula 2-1 | 200 | 7,000 | 6.0 | 10 | 0.65 |
| Example 3 | Chemical Formula 2-1 | 400 | 7,000 | 6.0 | 20 | 0.65 |
| Example 4 | Chemical Formula 2-1 | 300 | 7,000 | 5.0 | 15 | 0.55 |
| Example 5 | Chemical Formula 2-1 | 300 | 7,000 | 7.0 | 15 | 0.75 |
| Example 6 | Chemical Formula 2-1 | 300 | 5,000 | 6.0 | 15 | 0.65 |
| Example 7 | Chemical Formula 2-1 | 300 | 10,000 | 6.0 | 15 | 0.65 |
| Comparative Example 1 | Chemical Formula 2-1 | 140 | 7,000 | 6.0 | 7 | 0.65 |
| Comparative Example 2 | Chemical Formula 2-1 | 460 | 7,000 | 6.0 | 23 | 0.65 |
| Comparative Example 3 | Chemical Formula 2-1 | 300 | 7,000 | 4.5 | 15 | 0.50 |
| Comparative Example 4 | Chemical Formula 2-1 | 300 | 7,000 | 7.5 | 15 | 0.80 |
| Comparative Example 5 | Chemical Formula 2-1 | 300 | 4,000 | 6.0 | 15 | 0.65 |
| Comparative Example 6 | Chemical Formula 2-1 | 300 | 12,000 | 6.0 | 15 | 0.65 |
| Comparative Example 7 | Titanium acetylacetonate | 300 | 7,000 | 6.0 | 15 | 0.65 |
| Comparative Example 8 | Antimony Trioxide | 400 | 7,000 | 6.0 | 20 | 0.65 |
| Comparative Example 9 | Antimony Trioxide | 300 | 7,000 | 6.0 | 15 | 0.65 |
| Comparative Example 10 | Antimony Trioxide | 500 | 7,000 | 6.0 | 25 | 0.65 |

Experimental Example 1: Evaluation of Physical Properties of Resins and Fibers

The physical properties of the flame-retardant polyester resins and flame-retardant polyester fibers manufactured in Examples 1 to 7 and Comparative Examples 1 to 10 were evaluated through the following methods, and the results are shown in Tables 2 to 4 below.

(1) Measurement of Intrinsic Viscosity

Polyester resin was melted at a concentration of 2.0 g/25 mL in the Ortho-Chloro Phenol solvent at 110° C. for 30 minutes, and then, it was incubated at 25° C. for 30 minutes, and intrinsic viscosity was measured by using an automatic viscosity measurement device connected to a CANON viscometer.

(2) Quantification of Carboxyl Terminal Groups

The polyester resin was measured according to the PHOL method. Specifically, 0.1000 to 0.1500 g of the polymerization product powder, which was pulverized to a size of 20 mesh, was precisely weighed and placed into a test tube, and 5 mL of benzyl alcohol was added thereto, stirred with a micro stirrer, and heated and dissolved at 210° C. for 120 to 150 seconds. Immediately after dissolution, the test tube was immersed in water at 20 to 30° C. for 6 to 7 seconds and quenched, and the contents were poured into a 50 mL beaker containing 10 mL of chloroform. Afterwards, 5 mL of benzyl alcohol was added to test tube, and while stirring for 60 seconds, the remaining resin solution was completely rinsed and immediately added to the beaker, and it was used as the titration solution. The carboxyl group content was neutralized and titrated with a 0.1N sodium hydroxide benzyl alcohol solution using phenol red (0.1% benzyl alcohol solution) as an indicator by using a microsyringe (capacity of 100 μL), and the titration determination value was corrected according to the blank test result for a titration reagent and calculated according to Relationship Formula 1 below:

Number of carboxyl groups (eq./$10^6$ g Polymerization product)=[{Volume of titrant (μL)−Blank test result (μL)}×0.1×f]/(Weight of polymerization product sample)     [Relationship Formula 1]

wherein f is the concentration coefficient of a 0.1N sodium hydroxide benzyl alcohol solution.

(3) Measurement of Strength

The strength of the polyester fiber was measured by applying a speed of 20 mm/min and a gripping distance of 10 mm using an automatic tensile tester (Textechno). The value obtained by dividing the applied load by the fineness (denier) when the fiber was stretched until it was cut by applying a constant force was used as the strength.

(4) Number of Wiping

In the manufacturing process of the fiber, it was calculated how many times per day wiping of the spinneret was performed.

(5) Measurement of b* (b Value) and K/S Value (Color Strength)

The color of the polyester fiber was analyzed through a colorimeter to measure b* and K/S values. The measurement method was based on spectroscopy, and the method of calculating chromaticity coordinates by using a CIE standard light source and standard observer was used.

(6) Acetaldehyde Generation Amount

The polyester fiber was placed in a 3 L Tedlar bag, and after it was filled with nitrogen by ⅔, the Tedlar bag was placed in an oven which was set at a temperature of 65° C.

and heated for 2 hours, and then, after it was leaf at room temperature for 30 minutes, nitrogen was additionally filled until the sample bag was completely filled with nitrogen. Afterwards, the acetaldehyde generation amount was measured by using a gas detection tube manufactured by Gastec.

(7) Measurement of Limiting Oxygen Index (LOI)

The limiting oxygen index (LOI) of the polyester fiber was measured according to the KS M 3032 method.

(8) Spinning Workability (Drip Occurrence Count)

During the spinning process, the drip occurrence count per hour was measured.

(9) Evaluation of Cross-Section Uniformity

When the rate of change of the diameter between each single yarn of the polyester fiber is expressed as a percentage, it was evaluated as 'excellent' if the rate of change was less than 5%, 'normal' if it was 5 to 8%, and 'poor' if it was more than 8%.

TABLE 2

| | | Example 1 | Example 2 | Example 3 | Example 4 | Example 5 | Example 6 |
|---|---|---|---|---|---|---|---|
| Resin | Intrinsic viscosity | 0.67 | 0.66 | 0.67 | 0.66 | 0.68 | 0.62 |
| | Number of carboxyl groups (ea) | 33 | 32 | 36 | 34 | 33 | 32 |
| Fiber | Strength (g/de) | 4.5 | 4.2 | 4.3 | 4.4 | 4.6 | 4.1 |
| | Number of wiping (ea/day) | 1 | 1 | 1 | 1 | 2 | 1 |
| | b* | 1.6 | 2.1 | 1.2 | 1.5 | 1.5 | 1.6 |
| | K/S value | 43 | 40 | 44 | 43 | 43 | 43 |
| | Acetaldehyde generation amount (ppb) | 350 | 370 | 340 | 350 | 350 | 350 |
| | LOI (%) | 33 | 32 | 34 | 31 | 35 | 33 |
| | Drip occurrence count (ea.) | 0 | 0 | 0 | 0 | 0 | 0 |
| | Cross-section uniformity | Excellent | Excellent | Excellent | Excellent | Excellent | Excellent |

TABLE 3

| | | Example 7 | Comparative Example 1 | Comparative Example 2 | Comparative Example 3 | Comparative Example 4 | Comparative Example 5 |
|---|---|---|---|---|---|---|---|
| Resin | Intrinsic viscosity | 0.74 | 0.66 | 0.67 | 0.65 | 0.69 | 0.56 |
| | Number of carboxyl groups | 35 | 30 | 42 | 39 | 35 | 32 |
| Fiber | Strength (g/de) | 5.0 | 4.0 | 4.4 | 4.2 | 4.3 | 2.8 |
| | Number of wiping (ea/day) | 1 | 1 | 5 | 1 | 10 | 1 |
| | b* | 1.5 | 2.9 | 1.1 | 1.6 | 1.5 | 1.8 |
| | K/S value | 43 | 34 | 44 | 43 | 43 | 41 |
| | Acetaldehyde generation amount (ppb) | 350 | 420 | 320 | 350 | 350 | 350 |
| | LOI (%) | 31 | 31 | 32 | 27 | 35 | 30 |
| | Drip occurrence count (ea.) | 0 | 0 | 0 | 0 | 0 | 3 |
| | Cross-section uniformity | Excellent | Excellent | Excellent | Excellent | Excellent | Excellent |

TABLE 4

| | | Comparative Example 6 | Comparative Example 7 | Comparative Example 8 | Comparative Example 9 | Comparative Example 10 |
|---|---|---|---|---|---|---|
| Resin | Intrinsic viscosity | 0.82 | 0.65 | 0.68 | 0.60 | 0.70 |
| | Number of carboxyl groups | 35 | 42 | 63 | 65 | 67 |
| Fiber | Strength (g/de) | 5.6 | 4.3 | 4.5 | 3.9 | 4.9 |
| | Number of wiping (ea/day)) | 1 | 3 | 5 | 6 | 6 |
| | b* | 1.9 | 2.6 | 4.0 | 3.9 | 3.9 |
| | K/S value | 40 | 36 | 29 | 30 | 28 |
| | Acetaldehyde generation amount (ppb) | 350 | 410 | 620 | 650 | 640 |
| | LOI (%) | 31 | 31 | 33 | 32 | 33 |
| | Drip occurrence count (ea.) | 2 | 0 | 0 | 0 | 0 |
| | Cross-section uniformity | Poor | Excellent | Excellent | Excellent | Excellent |

Referring to Tables 2 to 4, it was confirmed that the flame-retardant polyester fibers manufactured in Examples 1 to 7 had excellent physical properties. On the other hand, Comparative Example 1, in which the amount of titanium element remaining in the fiber was 7 ppm, had problems in that since b* (b value) was high, the dyeability of the fiber was poor and the dyeing rate (color strength, K/S) was poor, and since the acetaldehyde generation amount was high, it was harmful to the human body, compared to Example 2 in which the amount of titanium element remaining in the fiber was 10 ppm.

In addition, Comparative Example 2, in which the amount of titanium element remaining in the fiber was 23 ppm, had problems in that as the carboxyl group (COOH group) was excessively generated at the terminal of the flame-retardant polyester resin, the degree of contamination of the nozzle surface was significantly increased, in resulting in a shortened wiping cycle, compared to Example 3 in which the amount of titanium element remaining in the fiber was 20 ppm, In addition, Comparative Example 3, in which the content of the additive-type flame retardant was 4.5 wt. %, had significantly lowered flame retardancy, compared to Example 4 in which the content of the additive-type flame retardant was 5.0 wt. %.

In addition, Comparative Example 4, in which the content of the additive-type flame retardant was 7.5 wt. %, had a remarkably shortened wiping cycle as the contamination of the nozzle surface increased, compared to Example 5 in which the content of the additive-type flame retardant was 7.0 wt. %.

In addition, Comparative Example 5, which was manufactured by using an additive-type flame retardant having a weight average molecular weight of 4,000, had problems in that not only the strength of the fiber was poor due to the low viscosity, but also the drip occurrence count increased during the spinning process, resulting in poor quality of the fiber, compared to the flame-retardant polyester fiber (Example 6) manufactured by using a weight average molecular weight of 5,000.

In addition, Comparative Example 6, which was manufactured by using an additive-type flame retardant having a weight average molecular weight of 12,000, had a problem in that the cross-section of the fiber was not uniform due to high viscosity, compared to the flame-retardant polyester fiber (Example 7) manufactured by using a weight average molecular weight of 10,000.

In addition, Comparative Example 7, which used titanium acetylacetonate instead of the compound represented by Formula 2-1 as the titanium-based catalyst, had a problem in that there was an excessive number of carboxyl groups (COOH group) at the terminal of the resin, compared to Example 1 which used the compound represented by Formula 2-1 as the titanium-based catalyst, and accordingly, there was a problem in that the wiping cycle was shortened due to the increased contamination of the nozzle surface. In addition, compared to Example 1, Comparative Example 7 had problems in that the dyeability and dyeing rate were poor, and it was found that the physical properties were relatively poor due to the large acetaldehyde generation amount.

In addition, compared to Example 1 in which the compound represented by Chemical Formula 2-1 was used as the titanium-based catalyst, Comparative Examples 8 to 10, which used an antimony-based catalyst as the polymerization catalyst, had problems in that the number of carboxyl groups (COOH) group) remarkably increased, and the wiping cycle was shortened due to the increased contamination of the nozzle surface, and the acetaldehyde generation amount was also remarkably high, and the dyeability and dying rate were not good. Through this, it can be seen that Comparative Examples 8 to 10 had poor physical properties compared to the fibers manufactured by using a titanium-based catalyst.

Simple modifications or changes of the present invention can be easily carried out by those skilled in the art, and all such modifications or changes can be considered to be included in the scope of the present invention.

The invention claimed is:

1. A flame-retardant polyester fiber with excellent dyeability that is a polyester fiber stretched from a spinning product of a flame-retardant polyester resin comprising 5.0 to 7.0 wt % of an additive-type flame retardant represented by Chemical Formula 1 below and a remainder of a polymerization product, wherein the polymerization product is a polymerization product of a polymerization reactant comprising an ester reactant, a heat stabilizer, and a titanium-based catalyst represented by Chemical Formula 2 below, wherein the additive-type flame retardant has an average molecular weight of 5,000 to 11,000, wherein the polyester fiber comprises:
10 to 20 ppm of titanium (Ti) element in the fiber; and
an additive-type flame retardant represented by Chemical Formula 1 below in an amount of 0.55 to 0.75 wt. % based on the amount of phosphorus (P) element in 100 wt. % of the fiber, wherein the polyester fiber has a limiting oxygen index (LOI) of 30% or more as measured according to the KS M 3032 method, and wherein the fiber has a strength of 3.6 to 6.0 g/de:

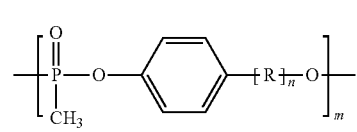

[Chemical Formula 1]

wherein in Chemical Formula 1 above, R is an alkylene group having 1 to 5 carbon atoms, n is an integer of 1 to 20, and m is an integer of 1 to 80;

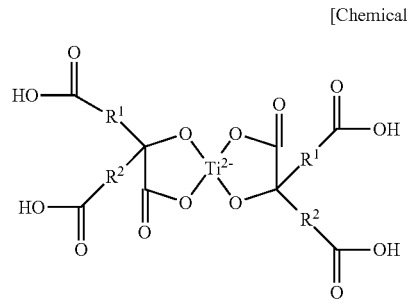

[Chemical Formula 2]

wherein in Chemical Formula 2 above, $R^1$ and $R^2$ are each independently a straight-chain alkylene group having 1 to 5 carbon atoms or a branched alkylene group having 3 to 5 carbon atoms.

2. The flame-retardant polyester fiber of claim 1, wherein the fiber has b* of 1.0 to 2.5 when chromaticity coordinates are calculated by using a CIE standard light source and a standard observer.

3. The flame-retardant polyester fiber of claim 1, wherein the fiber has an acetaldehyde generation amount of 400 ppb or less as measured through a gas detection tube.

4. A method for manufacturing a flame-retardant polyester fiber with excellent dyeability, comprising:
- step 1 of obtaining an ester reactant by reacting an acid component and a diol component;
- step 2 of preparing a polymerization product by mixing and reacting a polymerization reactant comprising the ester reactant, a heat stabilizer and a titanium-based catalyst represented by Chemical Formula 2 below;
- step 3 of removing impurities from the polymerization product;
- step 4 of preparing a flame-retardant polyester resin by mixing the polymerization product obtained in step 3 and an additive-type flame retardant represented by Chemical Formula 1 below;
- step 5 of producing a spinning product by spinning the flame-retardant polyester resin; and
- step 6 of stretching the spinning product to manufacture a flame-retardant polyester fiber,
- wherein the additive-type flame retardant has an average molecular weight of 5,000 to 11,000, and is comprised in an amount of 5.0 to 7.0 wt. % based on the total weight of the flame-retardant polyester resin,
- wherein the flame-retardant polyester fiber in step 6 comprises 10 to 20 ppm of titanium (Ti) element in the fiber and 0.55 to 0.75 wt % of phosphorus (P) element based on 100 wt % of the fiber,
- wherein the flame-retardant polyester fiber has a limiting oxygen index (LOI) of 30% or more as measured according to the KS M 3032 method, and
- wherein the fiber has a strength of 3.6 to 6.0 g/de:

[Chemical Formula 1]

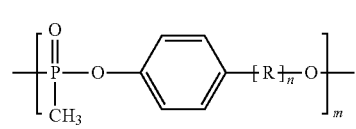

wherein in Chemical Formula 1 above, R is an alkylene group having 1 to 5 carbon atoms, n is an integer of 1 to 20, and m is an integer of 1 to 80,

[Chemical Formula 2-1]

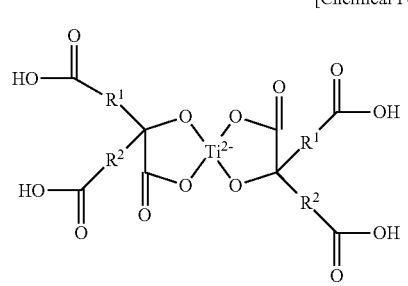

wherein in Chemical Formula 2 above, $R^1$ and $R^2$ are each independently a straight-chain alkylene group having 1 to 5 carbon atoms or a branched alkylene group having 3 to 5 carbon atoms.

5. The method of claim 4, wherein the titanium-based catalyst comprises 200 to 400 ppm of a catalyst based on the total weight of the polymerization reactant.

* * * * *